(12) United States Patent
Song et al.

(10) Patent No.: US 10,341,238 B2
(45) Date of Patent: Jul. 2, 2019

(54) TRANSMISSION CONTROL METHOD, APPARATUS AND SYSTEM

(71) Applicant: Huawei Technologies Co., Ltd., Shenzhen (CN)

(72) Inventors: Haibin Song, Shenzhen (CN); Ning Zong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 273 days.

(21) Appl. No.: 15/279,126

(22) Filed: Sep. 28, 2016

(65) Prior Publication Data

US 2017/0019338 A1    Jan. 19, 2017

Related U.S. Application Data

(63) Continuation of application No. PCT/CN2015/073793, filed on Mar. 6, 2015.

(30) Foreign Application Priority Data

Mar. 28, 2014    (CN) .......................... 2014 1 0124130

(51) Int. Cl.
*G01R 31/08* (2006.01)
*G06F 11/00* (2006.01)
(Continued)

(52) U.S. Cl.
CPC ........ *H04L 47/193* (2013.01); *H04L 43/0882* (2013.01); *H04L 43/16* (2013.01);
(Continued)

(58) Field of Classification Search
CPC ............... H04L 47/193; H04L 43/0882; H04L 43/126; H04L 47/12; H04L 47/225; H04L 47/37; H04L 69/163
See application file for complete search history.

(56) References Cited

U.S. PATENT DOCUMENTS 7,035,214 B1 *   4/2006   Seddigh ................ H04L 1/1635
                                                               370/231
2002/0150048 A1 *   10/2002   Ha ........................ H04L 1/1887
                                                               370/231
(Continued)

FOREIGN PATENT DOCUMENTS

CN          101094047 A       12/2007
CN          101854738 A       10/2010
(Continued)

OTHER PUBLICATIONS

Chu et al., "Increasing TCP's Initial Window," Request for Comments: 6928, Experimental pp. 1-24, Internet Engineering Task Force (IETF) (Apr. 2013).

*Primary Examiner* — Stephen M D Agosta
(74) *Attorney, Agent, or Firm* — Leydig, Voit & Mayer, Ltd.

(57) ABSTRACT

The present invention discloses a transmission control method, apparatus and system, so as to effectively utilize network link resources. The method of the present invention includes: acquiring link status information about a network; determining recommended values of TCP transmission parameters according to the link status information; and performing TCP transmission according to the determined recommended values of the parameters. The present invention can enable TCP transmission status to reflect network congestion status more real, prevent a congestion misjudgment from occurring, and improve a utilization ratio of link resources in a network.

4 Claims, 7 Drawing Sheets

(51) Int. Cl.
*G08C 15/00* (2006.01)
*H04J 1/16* (2006.01)
*H04J 3/14* (2006.01)
*H04L 1/00* (2006.01)
*H04L 12/26* (2006.01)
*H04L 12/28* (2006.01)
*H04L 12/801* (2013.01)
*H04L 12/815* (2013.01)
*H04L 29/06* (2006.01)

(52) U.S. Cl.
CPC ............ *H04L 47/12* (2013.01); *H04L 47/225* (2013.01); *H04L 47/37* (2013.01); *H04L 69/163* (2013.01)

(56) References Cited

U.S. PATENT DOCUMENTS

| | | | |
|---|---|---|---|
| 2003/0063564 A1* | 4/2003 | Ha | H04L 12/5692 370/230 |
| 2006/0034286 A1* | 2/2006 | Koning | H04L 69/16 370/394 |
| 2007/0070906 A1 | 3/2007 | Thakur | |
| 2008/0144660 A1 | 6/2008 | Godlewski | |
| 2010/0110989 A1 | 5/2010 | Wu et al. | |
| 2012/0057511 A1* | 3/2012 | Sivakumar | H04W 28/06 370/310 |
| 2013/0044598 A1* | 2/2013 | Zhang | H04L 43/0882 370/232 |
| 2014/0010088 A1* | 1/2014 | Stewart | H04L 47/33 370/237 |

FOREIGN PATENT DOCUMENTS

| | | |
|---|---|---|
| CN | 102201997 A | 9/2011 |
| CN | 102546832 A | 7/2012 |
| JP | 2009218912 A | 9/2009 |

* cited by examiner

TRANSMISSION CONTROL METHOD, APPARATUS AND SYSTEM

CROSS-REFERENCE TO RELATED APPLICATIONS

This application is a continuation of International Application No. PCT/CN2015/073793, filed on Mar. 6, 2015, which claims priority to Chinese Patent Application No. 201410124130.6, filed on Mar. 28, 2014. The disclosures of the aforementioned applications are hereby incorporated by reference in their entireties.

TECHNICAL FIELD

The present invention relates to the field of network transmission, and particularly to a transmission control method, apparatus, and system.

BACKGROUND

The Transmission Control Protocol (TCP) is one of major transmission protocols currently applied in Internet, which can provide a connection-oriented and reliable byte-stream service.

TCP transmission parameters involved in TCP-based network congestion control mainly include a congestion window, an advertised window, a sending window, a congestion avoidance threshold, a round-trip time, a retransmission timeout count, and a fast retransmission threshold. The congestion window is a key parameter in congestion control, and describes a maximum quantity of packets a sender can send once in congestion control. The advertised window is the size of a sending window the sender presets for a receiver, and functions in a preliminary phase in establishing a TCP connection. The sending window is the size of a window for the sender to actually send data each time. The congestion avoidance threshold is a demarcation point between a slow start phase and a congestion avoidance phase in congestion control, for which an initial value is usually set to 65535 bytes. The round-trip time (RTT) is a time interval from a point when the sender sends a TCP packet to the receiver to a point when the sender receives an ACK acknowledgement packet returned by the receiver. The retransmission timeout (RTO) describes a time interval from a point when a packet is sent to a point when the packet expires, is an important parameter for determining whether the packet is lost and whether a network is congested, and is usually set to 2RTT or 5RTT. The fast retransmission threshold is a quantity of duplicate acknowledgement (ACK) packets which can trigger a fast retransmission, and the network proceeds to a fast retransmission phase when the fast retransmission threshold is exceeded, where a default value of the fast retransmission threshold is 3.

In the transmission process with TCP transmission-based congestion control, the slow start phase is performed first. The sender sets a size of the sending window to a smaller one of sizes of an initial congestion window and the advertised window, and each time segmented packets in a quantity of the congestion window are sent and ACK (acknowledgement) packets for all the segmented packets are successfully received, doubles the size of the congestion window and ensures that the size of the congestion window does not exceeds the current size of the receiver window. The process repeats until the sender receives duplicate ACK packets in a quantity which is equal to or greater than the fast retransmission threshold, the congestion avoidance threshold is set to a half of a current size of the congestion window, a size of the sending window is adjusted to the congestion avoidance threshold, and a congestion avoidance phase is entered. In the congestion avoidance phase, the congestion window is increased by one packet segment within each RTT. A size of the congestion window is halved and the congestion avoidance threshold is adjusted to a half of the size of the congestion window before congestion when a timeout occurs to the sender or the sender receives duplicate ACK packets whose quantity is equal to or greater than the fast retransmission threshold.

In the TCP transmission control above, whether the network is congested is determined according to a status of sent and received packets, and then relevant TCP transmission parameters are adjusted accordingly. However, in a case in which the network is in good condition, packet loss or timeout may occur as well, and a misjudgment of congestion may be made, thus failing to fully utilize link resources in the network.

SUMMARY

A transmission control method and apparatus are provided according to embodiments of the present invention, to solve the problem of congestion misjudgment in existing TCP transmission control and a low utilization ratio of available network bandwidth resources.

In a first aspect, a transmission control method is provided, which includes:

acquiring link status information of a network;

determining recommended values of parameters for TCP transmission according to the link status information; and sending the recommended values of the parameters to a TCP agent, to instruct the TCP agent to perform TCP transmission control according to the recommended values of the parameters.

With reference to the first aspect, in a first implementation manner, the determining recommended values of parameters for TCP transmission according to the link status information specifically includes:

determining a recommended size of an initial congestion window and recommended congestion avoidance thresholds corresponding to different subscribed bandwidths according to the link status information, the performing TCP transmission control according to the recommended values of the parameters includes:

in a slow start phase, adjusting an initial sending window according to the recommended size of the initial congestion window and transmitting segmented packets based on the adjusted initial sending window until a congestion avoidance phase is entered; and in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or to approximate to the size of the receiver window and making the congestion avoidance threshold keep synchronized variation with the change of the receiver window.

In a second aspect, a transmission control method is provided, which includes:

sending a query request for a link status to an optimization server, where the query request carries identifiers of a sending communication node and a receiving communication node involved in TCP transmission;

receiving status information, fed back by the optimization server in response to the query request, of a link between communication nodes corresponding to the identifiers of the sending communication node and the receiving communication node carried in the received query request;

determining recommended values of parameters for TCP transmission according to the received status information of the link between the communication nodes; and performing TCP transmission control according to the determined recommended values of the parameters.

With reference to the second aspect, in a first implementation manner, the determining recommended values of parameters for TCP transmission according to the received status information of the link between the communication nodes specifically includes:

acquiring a parameter optimization policy template sent by the optimization server; and determining the recommended values of the parameters for TCP transmission according to the parameter optimization policy template and the received status information of the link between the communication nodes.

With reference to the second aspect or the first implementation manner of the second aspect, in a second implementation manner, the determining recommended values of parameters for TCP transmission specifically includes:

determining a recommended size of an initial congestion window and recommended congestion avoidance thresholds corresponding to different subscribed bandwidths, the performing TCP transmission control according to the recommended values of the parameters includes:

in a slow start phase, adjusting an initial sending window according to the recommended size of the initial congestion window and transmitting segmented packets based on the adjusted initial sending window until a congestion avoidance phase is entered; and in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or to approximate to the size of the receiver window and making the congestion avoidance threshold keep synchronized variation with the change of the receiver window.

In a third aspect, a transmission control apparatus is provided, which includes an acquiring unit, a determining unit and an instructing unit, the acquiring unit is configured to: acquire link status information of a network and send the acquired link status information to the determining unit;

the determining unit is configured to: receive the link status information link sent by the acquiring unit, determine recommended values of parameters for TCP transmission according to the link status information, and send the determined recommended values of parameters to the instructing unit; and the instructing unit is configured to: receive the recommended values of the parameters sent by the determining unit, send the determined recommended values of the parameters to a TCP agent, and instruct the TCP agent to perform TCP transmission control according to the recommended values of the parameters.

With reference to the third aspect, in a first implementation manner, the determining unit is specifically configured to:

determine a recommended size of an initial congestion window and recommended congestion avoidance thresholds corresponding to different subscribed bandwidths according to the link status information, and the instructing unit is specifically configured to:

instruct the TCP agent to, in a slow start phase, adjust an initial sending window according to the recommended size of the initial congestion window and transmit segmented packets based on the adjusted initial sending window until a congestion avoidance phase is entered; and instruct the TCP agent to, in the congestion avoidance phase, if a recommended congestion avoidance threshold is less than a size of a receiver window and is less than a congestion avoidance threshold in actual transmission, adjust attenuation of the congestion avoidance threshold and control the attenuated congestion avoidance threshold to be greater than or equal to the recommended congestion avoidance threshold when a packet loss or a retransmission timeout occurs; or instruct the TCP agent to, in the congestion avoidance phase, if the recommended congestion avoidance threshold is greater than or equal to a size of a receiver window, adjust a congestion avoidance threshold to or to approximate to the size of the receiver window and make the congestion avoidance threshold keep synchronized variation with the change of the receiver window.

In a fourth aspect, a transmission control apparatus is provided, which includes a sending unit, a receiving unit, a determining unit and an adjusting unit, where the sending unit is configured to send a query request for a link status to an optimization server, where identifiers of a sending communication node and a receiving communication node involved in TCP transmission are carried in the query request;

the receiving unit is configured to: receive status information, fed back by the optimization server in response to the query request sent by the sending unit, of a link between communication nodes corresponding to the identifiers of the sending communication node and the receiving communication node carried in the received query request, and send the received status information of the link to the determining unit;

the determining unit is configured to: receive the status information of the link between the communication nodes sent by the receiving unit, determine recommended values of parameters for TCP transmission according to the status information of the link, and send the determined recommended values of the parameters to the adjusting unit; and the adjusting unit is configured to: receive the recommended values of the parameters sent by the determining unit, and adjust the TCP transmission parameters according to the recommended values of the parameters.

With reference to the fourth aspect, in a first implementation manner, the determining unit is specifically configured to:

acquire a parameter optimization policy template sent by the optimization server; and determine the recommended values of the parameters for TCP transmission according to the parameter optimization policy template and the received status information of the link between the communication nodes.

With reference to the fourth aspect or the first implementation manner of the fourth aspect, in a second implementation manner, the determining unit is specifically configured to:

determine a recommended size of an initial congestion window and recommended congestion avoidance thresholds corresponding to different subscribed bandwidths; and the adjusting unit is specifically configured to:

in a slow start phase, adjust an initial sending window according to the recommended size of the initial congestion window and transmit segmented packets based on the adjusted initial sending window until a congestion avoidance phase is entered; and in the congestion avoidance phase, if a recommended congestion avoidance threshold is less than a size of a receiver window and is less than a congestion avoidance threshold in actual transmission, adjust attenuation of the congestion avoidance threshold and control the attenuated congestion avoidance threshold to be greater than or equal to the recommended congestion avoidance threshold when a packet loss or a retransmission timeout occurs; or in the congestion avoidance phase, if the recommended congestion avoidance threshold is greater than or equal to a size of a receiver window, adjust a congestion avoidance threshold to or to approximate to the size of the receiver window and make the congestion avoidance threshold keep synchronized variation with the change of the receiver window.

In a fifth aspect, a transmission control system is provided, which includes an optimization server disposed on a network side and an agent disposed on a host computer side, the optimization server may be any transmission control apparatus according to the third aspect; and the agent may be any transmission control apparatus according to the fourth aspect.

In the transmission control method, apparatus and system according to the embodiments of the present invention, the recommended values of the parameters for TCP transmission are determined according to the acquired network link status information, and TCP transmission control is performed according to the recommended values of the parameters for TCP transmission, thus the determination of relevant TCP transmission parameters and the control for the transmission are according to an actual link status of the network. Compared with existing TCP transmission control according to the status of the sent and the received packets, a status of TCP transmission can reflect a congestion status of the network better, avoiding congestion misjudgment and improving a utilization ratio of link resources in the network.

DETAILED DESCRIPTION OF THE EMBODIMENTS

Technical solutions according to the embodiments of the present invention are described clearly in the following with reference to the drawings. Apparently, the described embodiments are only a part rather than all of the embodiments of the present invention. Any other embodiment obtained by a person of ordinary skill in the art based on the embodiments of the present invention without any creative work shall fall within the scope of the present invention.

Figure 1:
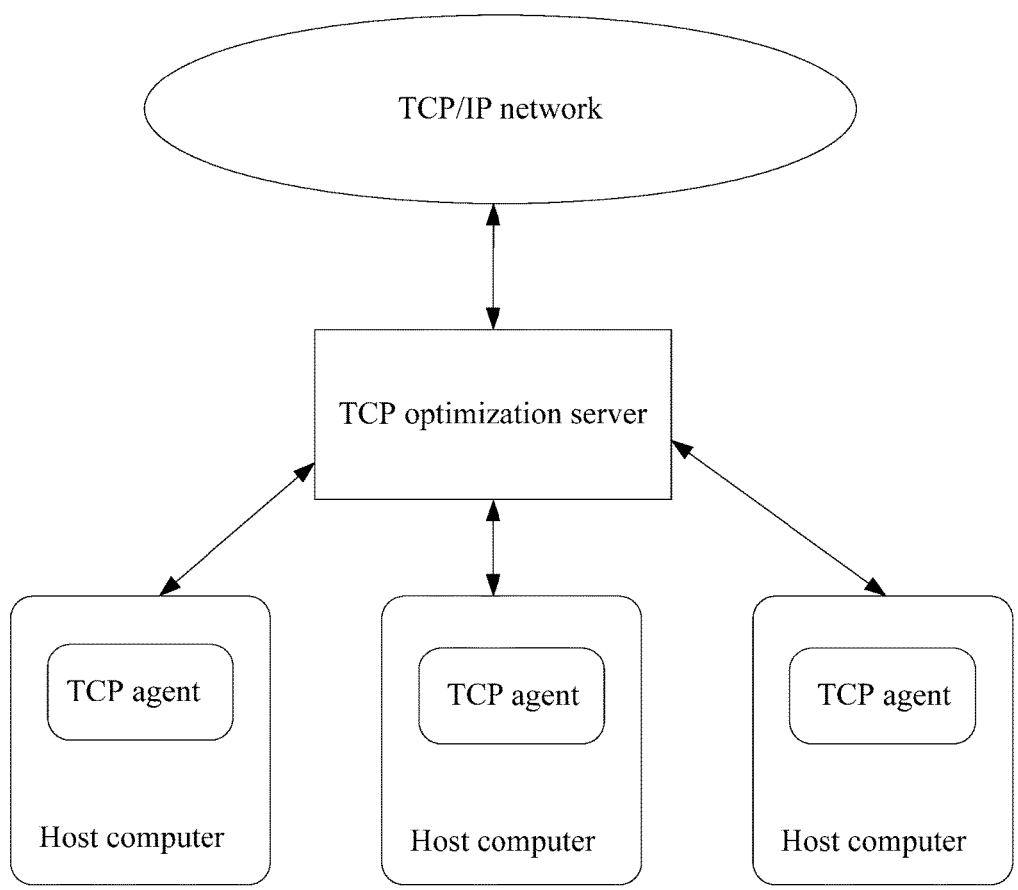
FIG. 1 is a diagram of the implementation principle of transmission control according to an embodiment of the present invention.

A control method according to the embodiments of the present invention, in which TCP transmission parameters are adjusted based on monitored network link status information, is applied in a network architecture illustrated in FIG. 1. In FIG. 1, the underlying network is a TCP/IP network, and a TCP optimization server deployed on a network side can dynamically acquire network link status information from the network and interact with a TCP agent deployed on a host computer side to determine recommended values of parameters for TCP transmission. The TCP transmission parameters can be adjusted and controlled according to the recommended values of the parameters when host computers communicate with each other, which can take an actual link status of the network into consideration, avoid a congestion misjudgment and effectively utilize link resources in the network.

In the embodiments of the present invention, for the recommended values of the parameters for TCP transmission, the TCP optimization server may directly determine the TCP transmission parameters according to the acquired network link status information, or the TCP agent may determine the TCP transmission parameters according to the network link status information acquired from the TCP optimization server. The two processes for determining the recommended values of the parameters for TCP transmission are described in the embodiments of the present invention hereinafter.

The case that the recommended values of the parameters for TCP transmission are determined by the TCP optimization server is described in one embodiment of the present invention.

Figure 2:
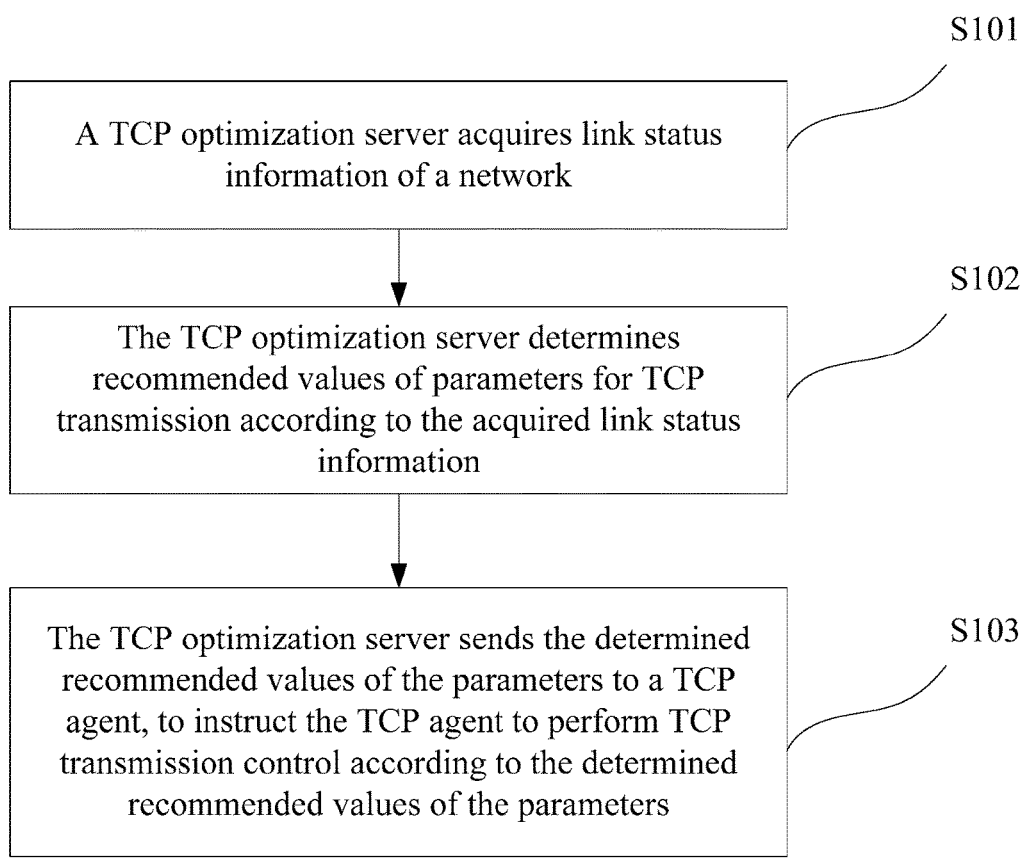
FIG. 2 is a flowchart of a transmission control method according to an embodiment of the present invention.

FIG. 2 is a flowchart for implementing a transmission control method, in which the recommended values of the transmission parameters are determined by the TCP optimization server, according to an embodiment of the present invention. As illustrated in FIG. 2, the transmission control method includes the following steps.

S101: The TCP optimization server acquires link status information of a network.

In this embodiment of the present invention, the TCP optimization server deployed on a network side acquires the network link status information from the network, where the acquired network link status information may include a delay, jitter, a packet loss, a bandwidth utilization ratio, and the like.

Furthermore, in different networks, network link status information may be acquired from different sources. For example, in a software-defined network (SDN), link status information of the SDN is acquired from an SDN controller; in a Multiprotocol Label Switching (MPLS) network, link status information of the MPLS network is acquired from a path computation element (PCE); and in an Internet Protocol (IP) network, link status information of the IP network is acquired from a network management or monitoring system. In this embodiment of the present invention, the TCP optimizations server may acquire the link status information of the network from a network management system, an SDN controller or a network monitoring node.

S102: The TCP optimization server determines recommended values of parameters for TCP transmission according to the link status information acquired in step S101.

In this embodiment of the present invention, a recommended size of an initial TCP congestion window and recommended congestion avoidance thresholds corresponding to different subscribed bandwidths may be determined for the whole network, a regional network or a preset link in a preset time range, according to the acquired link status information.

In this embodiment of the present invention, the whole network may be a whole underlying TCP/IP network, the regional network may be a part of a carrier network, a local area network or a hotspot network, and the preset link may be a link interconnected between enterprises through virtual private network (VPN) or a link interconnected between domain controllers (DC) through VPN.

S103: The TCP optimization server sends the determined recommended values of the parameters to a TCP agent, to instruct the TCP agent to perform TCP transmission control according to the determined recommended values of the parameters.

In this embodiment of the present invention, the TCP agent disposed on a host computer side communicates with the TCP optimization server disposed on the network side, to acquire the recommended values of the parameters for TCP transmission, and performs TCP transmission control according to the determined recommended values of the parameter.

According to this embodiment of the present invention, in the TCP transmission control according to the recommended values of the parameters, if a sending communication node and a receiving communication node, between which TCP communication is performed, are both in a same network management domain, recommended values of parameters for TCP transmission for the network management domain are used; if the sending communication node and the receiving communication node, between which TCP communication is performed, are both in a regional network, recommended values of parameters for TCP transmission for the regional network are used, where the regional network may be a part of a carrier network, a local area network or a hotspot network; and if the sending communication node and the receiving communication node, between which TCP communication is performed, are both on a link, recommended values of parameters for TCP transmission for the link are used to optimize corresponding TCP transmission, where the link may be a link obtained by interconnecting enterprises through VPN or interconnecting DCs through VPN.

In the transmission control method according to this embodiment of the present invention, the TCP optimization server disposed on the network side determines the recommended values of the parameters for TCP transmission according to acquired network link status information, sends the recommended values of the parameters for TCP transmission to the TCP agent, to instruct the TCP agent to perform TCP transmission control according to the recommended values of the parameters, so that the transmission parameters for the TCP transmission control can be set according to an actual link status of the network, that is, the transmission control process is adjusted and controlled based an actual network status. Compared with existing TCP transmission control according to the status of the sent and the received packets, status of TCP transmission can reflect a congestion status of the network better, avoiding congestion misjudgment and improving a utilization ratio of link resources in the network.

The process of determining the recommended values of the parameters for TCP transmission on a TCP optimization server side and performing TCP transmission control according to the invention is described in detail in the following with reference to practical application.

Figure 3:
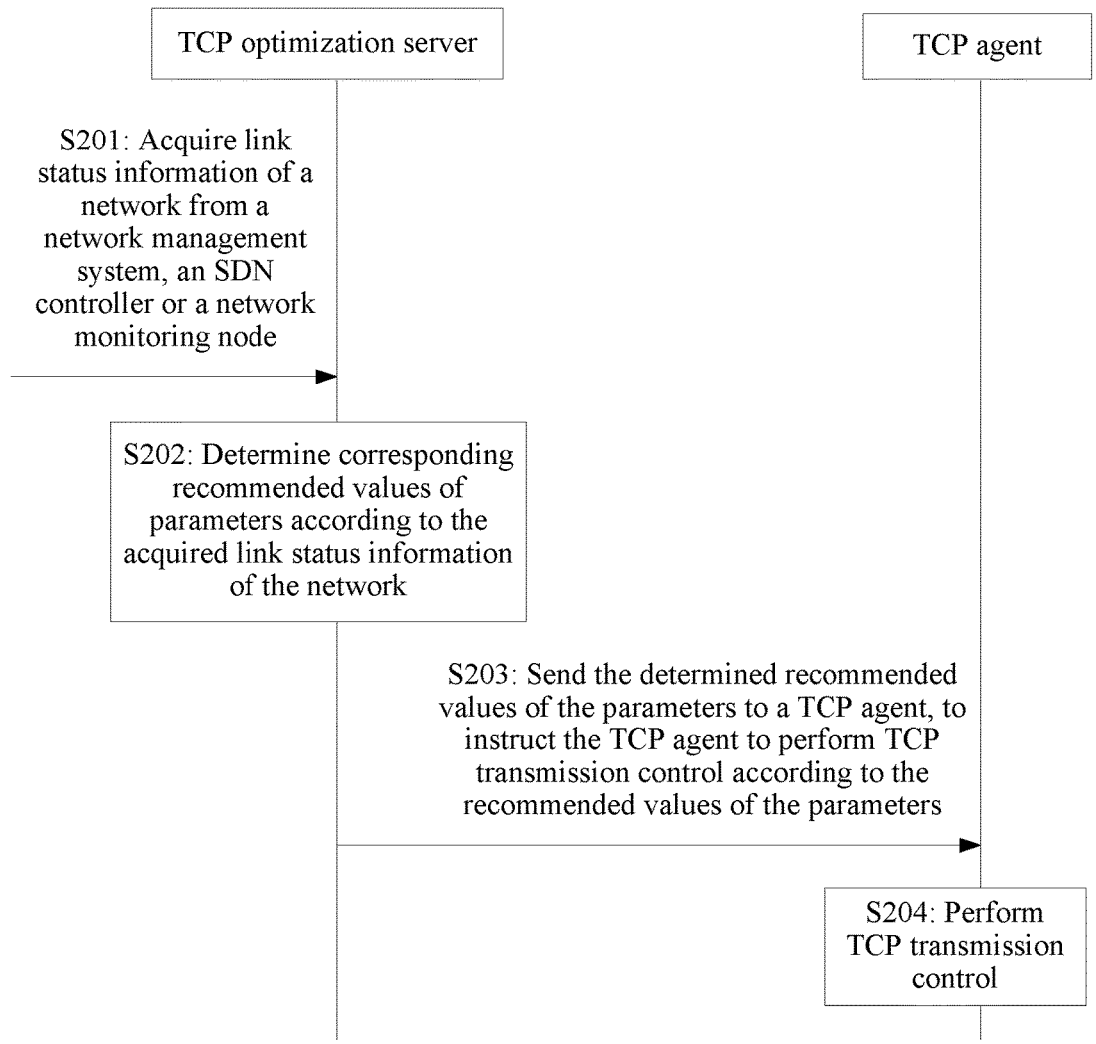
FIG. 3 is a flowchart of setting TCP transmission parameters on a TCP optimization server side and implementing transmission control according to an embodiment of the present invention.

FIG. 3 is a flowchart of setting TCP transmission parameters on a TCP optimization server side and implementing transmission control according to an embodiment of the present invention.

S201: A TCP optimization server directly acquires link status information of a network from a network management system, an SDN controller or a network monitoring node.

S202: The TCP optimization server determines corresponding recommended values of parameters, for example, a recommended size of an initial congestion window and recommended congestion avoidance thresholds corresponding to different subscribed bandwidths, according to the acquired link status information of the current network.

In this embodiment of the present invention, the recommended size of the initial congestion window and the recommended congestion avoidance thresholds corresponding to different subscribed bandwidths, of the whole network, a regional network or a preset link in a preset time range, are determined by the TCP optimization server.

In this embodiment of the present invention, the size of the initial congestion window may be determined according to an actual network status. For example, a large initial congestion window may be set in a case of a small link utilization ratio, and a small initial congestion window may be set in a case of an almost saturated link utilization ratio.

In this embodiment of the present invention, a smaller one of a subscribed uplink bandwidth of a sender and a downlink bandwidth of a receiver may be determined to be the recommended congestion threshold.

S203: The TCP optimization server sends the determined recommended values of the parameters to a TCP agent, to instruct the TCP agent to perform TCP transmission control according to the recommended values of the parameters.

S204: The TCP agent performs TCP transmission control according to the recommended values of the parameters.

In this embodiment of the present invention, in the process of TCP transmission, the TCP agent may implement configuration and controlling according to the recommended values of the transmission parameters.

Specifically, in this embodiment of the present invention, in a slow start phase, the specified recommended size of the initial congestion window is determined to be a size of a sending window, and segmented packets are transmitted until a congestion avoidance phase is entered. In this embodiment of the present invention, the segmented packets may be transmitted by using a conventional method in the slow start phase, where the size of the congestion window is doubled but not exceed a current size of a receiver window each time segmented packets in a quantity of the congestion window are sent and ACK packets for all the segmented packets are successfully received. The process repeats until the sender receives duplicate ACK packets in a quantity equal to or greater than the fast retransmission threshold, the congestion avoidance phase is entered.

In the congestion avoidance phase, giving a comprehensive consideration of the subscribed uplink bandwidth of the sender and the downlink bandwidth of the receiver involved in the communication, the TCP agent determines a smaller one of the subscribed uplink bandwidth of the sender and the downlink bandwidth of the receiver to be the recommended congestion avoidance threshold, and dynamically calculates and adjusts a relatively stable congestion avoidance threshold according to a size of the receiver window.

In this embodiment of the present invention, in the congestion avoidance phase, if the recommended congestion avoidance threshold is less than the size of the receiver window and is less than a congestion avoidance threshold in actual transmission, attenuation of the congestion avoidance threshold is adjusted and the attenuated congestion avoidance threshold is controlled to be greater than or equal to the recommended congestion avoidance threshold when a packet loss or a retransmission timeout occurs; or, if the recommended congestion avoidance threshold is greater than or equal to the size of the receiver window, a congestion avoidance threshold is adjusted to or to approximate to the size of the receiver window and keeps synchronized variation with the change of the receiver window.

Preferably, besides traffic shaping, the TCP optimization server may notify the TCP agent to reduce the size of the initial congestion window and the recommended congestion avoidance thresholds corresponding to different subscribed bandwidths in an emergency such as a part of the network being paralyzed.

In the transmission control method according to this embodiment of the present invention, the recommended values of the parameters of the whole network, the regional network or the preset link in the preset time range are determined on the TCP optimization server side. In the process of TCP transmission, the TCP agent can directly acquire the recommended values of the parameters for TCP transmission corresponding to a current link status of the network, and dynamically adjust and control the TCP transmission parameters of the whole network or a part of the network, avoiding congestion misjudgment and improving a utilization ratio of link resources in the network.

The case that the recommended values of the parameters for TCP transmission are determined by the TCP agent is described in an embodiment of the present invention.

Figure 4:
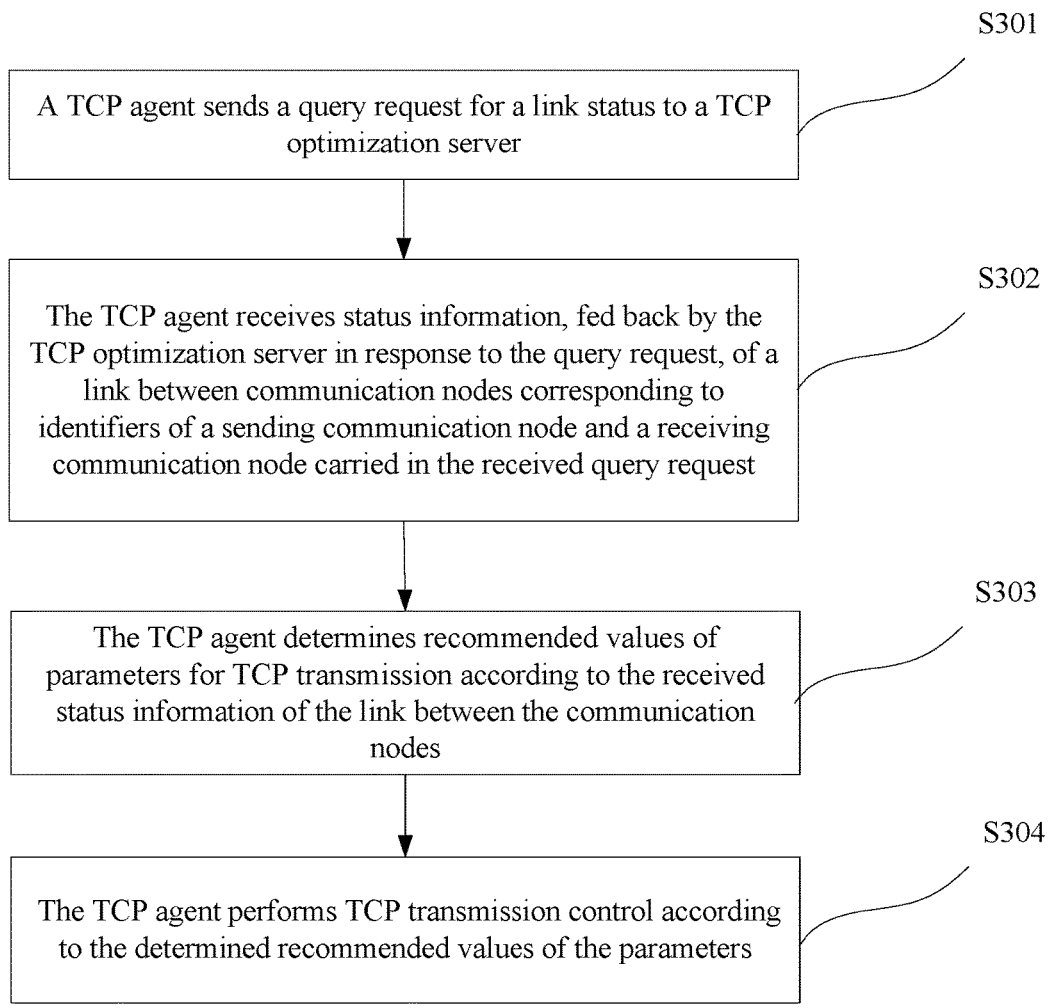
FIG. 4 is a flowchart of setting transmission parameters on a TCP agent side and implementing transmission control according to an embodiment of the present invention.

FIG. 4 is a flowchart of determining transmission parameters on a TCP agent side to implement TCP transmission control according to an embodiment of the present invention.

S301: A TCP agent sends a query request for a link status to a TCP optimization server.

In this embodiment of the present invention, the query request for link status sent from the TCP agent to the optimization server carries identifiers of a sending communication node and a receiving communication node involved in the TCP transmission.

S302: The TCP agent receives status information, fed back by the TCP optimization server in response to the query request, of a link between communication nodes corresponding to identifiers of a sending communication node and a receiving communication node carried in the received query request.

S303: The TCP agent determines recommended values of parameters for TCP transmission according to the received status information of the link between the communication nodes.

In step S304, the TCP agent performs TCP transmission control according to the recommended values of the parameters.

In this embodiment of the present invention, the recommended values of the parameters for TCP transmission are determined by the TCP agent, so that the TCP optimization server only needs to feed back a link status of the network in response to the query request of the TCP agent, rather than calculate all recommended values of the parameters of the network, alleviating a load of the TCP optimization server.

The process of determining the recommended values of the transmission parameters on a TCP agent side and performing TCP transmission control according to the present invention is described in connection with a practical application in detail hereinafter.

Figure 5:
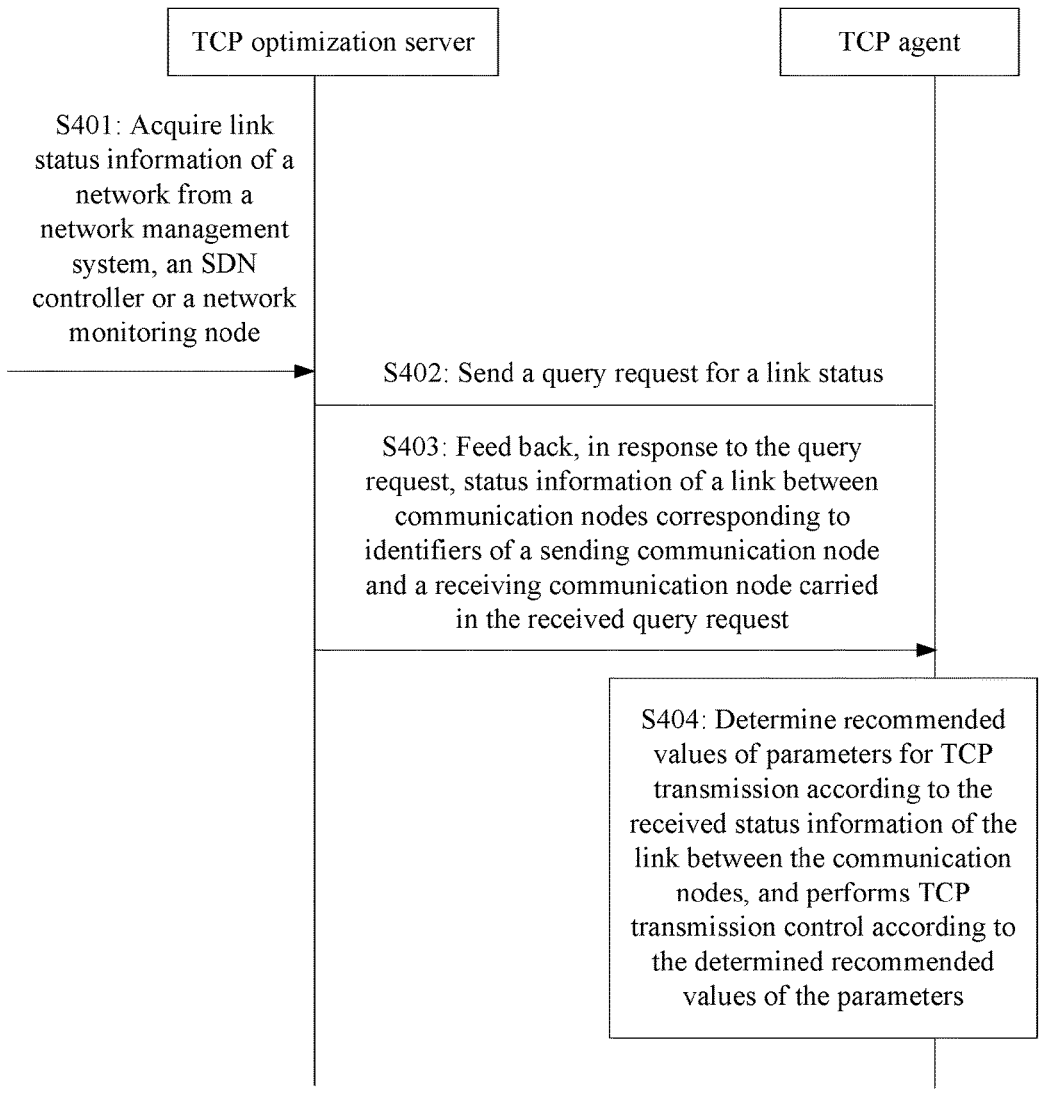
FIG. 5 is a schematic diagram of a transmission control according to an embodiment of the present invention.

FIG. 5 is a flowchart of transmission control according to an embodiment of the present invention, which, as illustrated in FIG. 5, includes the following steps.

S401: A TCP optimization server directly acquires link status information of a network from a network management system, an SDN controller or a network monitoring node.

S402: The TCP agent sends a query request for a link status to the TCP optimization server.

In this embodiment, the TCP optimization server makes statistics on the acquired network link status information and provides a query interface. The TCP agent on a host computer side may send a query request for a link status to the TCP optimization server, where identifiers of a sending communication node and a receiving communication node involved in TCP transmission are carried in the query request. The identifiers of the sending communication node and the receiving communication node may be a source address and a destination address involved in the TCP transmission, or may be identifiers of a source rendezvous point and a destination rendezvous point.

S403: The TCP optimization server feeds back, in response to the query request, status information of a link between communication nodes corresponding to identifiers of a sending communication node and a receiving communication node carried in the received query request.

S404: The TCP agent receives the status information, fed back by the TCP optimization server in response to the query request, of the link between the communication nodes, determines recommended values of parameters for TCP transmission according to the received status information of the link between the communication nodes and performs TCP transmission control according to the determined recommended values of the parameters.

In this embodiment, the TCP agent may query a link utilization ratio of a communication path currently in service, or uses a utilization ratio of a regional network queried in advance or a utilization ratio of the network.

In this embodiment, the TCP agent may determine the recommended values of the TCP parameters according to a queried link utilization ratio of the communication path currently in service, a utilization ratio of a regional network queried in advance or a utilization ratio of the network, and configure and control TCP transmission according to the recommended values together with a corresponding subscribed bandwidth and a size of a receiver window of a receiver.

In this embodiment of the present invention, the TCP agent may determine the recommended values of the relevant transmission parameters according to a current status of the link between communication nodes, such as a utilization ratio of the link, fed back by the TCP optimization server. For example, a large initial congestion window may be configured in a case of a small link utilization ratio, and a small initial congestion window may be configured in a case of an almost saturated link utilization ratio. TCP transmission is configured and controlled according to the recommended values of the corresponding transmission parameters.

In this embodiment of the present invention, configuring and controlling TCP transmission according to recommended values of the corresponding transmission parameters may include the following.

In a slow start phase, a size of an initial sending window is adjusted according to specified recommended size of an initial congestion window, and segmented packets are transmitted until a congestion avoidance phase is entered. In this embodiment of the present invention, the segmented packets may be transmitted by using a conventional method in the slow start phase, where the size of the congestion window is doubled but not exceed a current size of a receiver window each time segmented packets in a quantity of the congestion window are sent and ACK packets for all the segmented packets are successfully received. The process repeats until the sender receives duplicate ACK packets in a quantity equal to or greater than the fast retransmission threshold, the congestion avoidance phase is entered.

In the congestion avoidance phase, giving a comprehensive consideration of network utilization status, the subscribed uplink bandwidth of the sender and the downlink bandwidth of the receiver involved in the communication, the TCP agent determines the recommended congestion avoidance threshold, and dynamically calculates and adjusts, during the transmission, a relatively stable congestion avoidance threshold according to a size of the receiver window.

In this embodiment of the present invention, in the congestion avoidance phase, if the recommended congestion avoidance threshold is less than the size of the receiver window and is less than a congestion avoidance threshold in actual transmission, attenuation of the congestion avoidance threshold is adjusted and the attenuated congestion avoidance threshold is controlled to be greater than or equal to the recommended congestion avoidance threshold when a packet loss or a retransmission timeout occurs; or, if the recommended congestion avoidance threshold is greater than or equal to the size of the receiver window, a congestion avoidance threshold is adjusted to or to approximate to the size of the receiver window and keeps synchronized variation with the change of the receiver window.

In configuring the recommended size of the initial congestion window and the recommended congestion avoidance threshold according to this embodiment of the present invention, a status of the network in which the sender and the receiver communicating with each other currently locate, a size of the sending window of the sender and the size of the receiver window of the receiver are comprehensively considered, thus fully utilizing available bandwidth resources of the network, avoiding the problem that an initial congestion window with a fixed size set according to an empirical value cannot be dynamically adjusted, and avoiding a congestion misjudgment by not simply determining congestion according to packet loss or retransmission timeout.

Preferably, in this embodiment of the present invention, the TCP optimization server may send a parameter optimization policy template to the TCP agent for the TCP agent to determine the recommended values of the parameters, to advise the TCP agent on how to set corresponding transmission parameters in different bandwidth utilization ratio ranges and provide recommended values. The recommended values may depend on subscribed bandwidths of communication nodes, where the recommend values of the parameters provided by the TCP optimization server correspond to the subscribed bandwidths. For example, if TCP subscribed bandwidth is 4 Mbps and the utilization ratio of the link between the sending communication node and the receiving communication node is below 30%, the recommended size of the initial congestion window is 50 and the size of the congestion avoidance window is 2600. When determining the recommended values of the transmission parameters, the TCP agent can query for a link status of the network and determine the recommended values of the parameters for TCP transmission according to the received parameter optimization policy template and current status information of the link between the communication nodes after acquiring the current status information of the link between the communication nodes.

Figure 6:
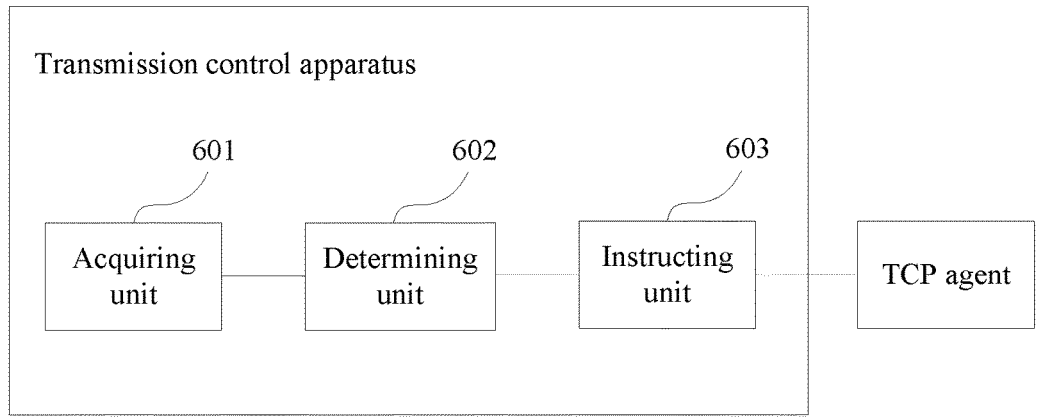
FIG. 6 is a structural diagram of a transmission control apparatus according to an embodiment of the present invention.

Based on the transmission control method in which the recommended values of the parameters are determined on the TCP optimization server side according to the foregoing embodiment of the present invention, a transmission control apparatus is provided according to an embodiment of the present invention, which includes an acquiring unit 601, a determining unit 602 and an instructing unit 603, as is illustrated in FIG. 6.

The acquiring unit 601 is configured to: acquire link status information of a network, and send the acquired link status information to the determining unit the determining unit 602 is configured to: receive the link status information link sent by the acquiring unit 601, determine recommended values of parameters for TCP transmission according to the link status information, and send the recommended values of parameters determined to the instructing unit; and the instructing unit 603 is configured to: receive the recommended values of the parameters sent by the determining unit 602, send the recommended values of the parameters to a TCP agent, and instruct the TCP agent to perform TCP transmission.

In this embodiment of the present invention, the determining unit 602 is specifically configured to determine a recommended size of an initial congestion window and recommended congestion avoidance thresholds corresponding to different subscribed bandwidths according to the link status information. The instructing unit 603 is configured specifically to: instruct the TCP agent to, in a slow start phase, adjust an initial sending window according to the recommended size of the initial congestion window and transmit segmented packets based on the adjusted initial sending window until a congestion avoidance phase is entered; and instruct the TCP agent to, in the congestion avoidance phase, if a recommended congestion avoidance threshold is less than a size of a receiver window and is less than a congestion avoidance threshold in actual transmission, adjust attenuation of the congestion avoidance threshold and control the attenuated congestion avoidance threshold to be greater than or equal to the recommended congestion avoidance threshold when a packet loss or a retransmission timeout occurs; or instruct the TCP agent to, in the congestion avoidance phase, if the recommended congestion avoidance threshold is greater than or equal to a size of a receiver window, adjust a congestion avoidance threshold to or to approximate to the size of the receiver window and make the congestion avoidance threshold keep synchronized variation with the change of the receiver window.

It should be noted that the transmission control apparatus according to this embodiment of the present invention may be a stand-alone device, for example, an optimization server disposed on a network side, or a device, which has the above functions, integrated in an optimization server.

The transmission control apparatus according to this embodiment of the present invention determines the recommended values of the parameters for TCP transmission according to the acquired network link status information, sends the recommended values of the parameters for TCP transmission to the TCP agent, to instruct the TCP agent to perform TCP transmission control according to the recommended values of the parameters, so that the transmission parameters for the TCP transmission control can be set according to an actual link status of the network, that is, the transmission control process is adjusted and controlled based an actual network status. Compared with existing TCP transmission control according to the status of the sent and the received packets, a status of TCP transmission can reflect a congestion status of the network better, avoiding congestion misjudgment and improving a utilization ratio of link resources in the network.

Figure 7:
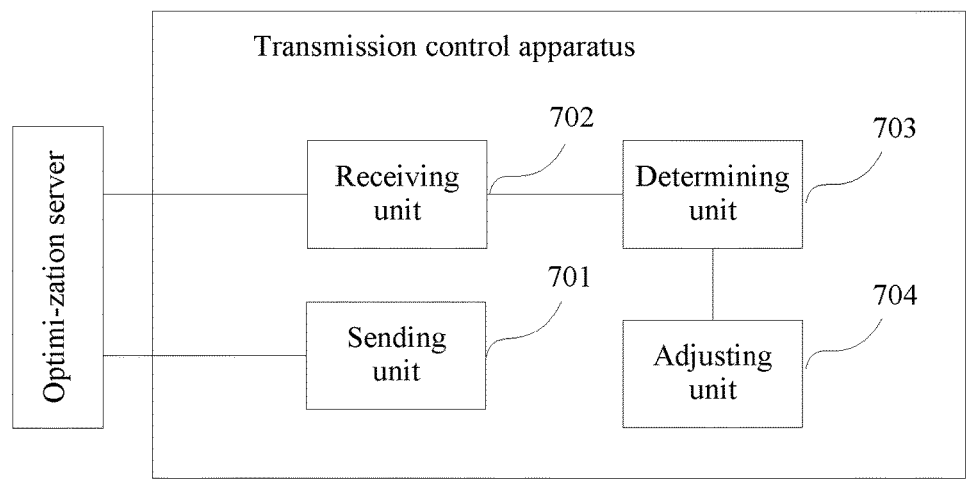
FIG. 7 is another structural diagram of a transmission control apparatus according to an embodiment of the present invention.

Based on the transmission control process in which the recommended values of the transmission parameters are determined on the TCP agent side according to above embodiment of the present invention, a transmission control apparatus is further provided according to an embodiment of the present invention, which includes a sending unit 701, a receiving unit 702, a determining unit 703 and an adjusting unit 704, as is illustrated in FIG. 7.

The sending unit 701 is configured to send a query request for a link status to an optimization server, where identifiers of a sending communication node and a receiving communication node involved in TCP transmission are carried in the query request.

The receiving unit 702 is configured to: receive status information, fed back by the optimization server in response to the query request sent by the sending unit 701, of a link between communication nodes corresponding to the identifiers of the sending communication node and the receiving communication node carried in the received query request, and send the received status information of the link to the determining unit 703.

The determining unit 703 is configured to: receive the status information of the link between the communication nodes sent by the receiving unit 702, determine recommended values of parameters for TCP transmission according to the status information of the link, and send the determined recommended values of the parameters to the adjusting unit 704.

The adjusting unit 704 is configured to receive the recommended values of the parameters sent by the determining unit 703 and adjust the TCP transmission parameters according to the recommended values of the parameters.

In a first implementation, the determining unit 703 is specifically configured to:
acquire a parameter optimization policy template sent by the optimization server; and
determine the recommended values of the parameters for TCP transmission according to the parameter optimization policy template and the received status information of the link between the communication nodes.

In a second implementation, the determining unit 703 is specifically configured to:
determine a recommended size of an initial congestion window and recommended congestion avoidance thresholds corresponding to different subscribed bandwidths.

The adjusting unit 704 is specifically configured to:
in a slow start phase, adjust an initial sending window according to the recommended size of the initial congestion window and transmit segmented packets based on the adjusted initial sending window until a congestion avoidance phase is entered; and
in the congestion avoidance phase, if a recommended congestion avoidance threshold is less than a size of a receiver window and is less than a congestion avoidance threshold in actual transmission, adjust attenuation of the congestion avoidance threshold and control the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjust a congestion avoidance threshold to or to approximate to the size of the receiver window and make the congestion avoidance threshold keep synchronized variation with the change of the receiver window.

It should be noted that the transmission control apparatus according to this embodiment of the present invention may be a stand-alone device, for example, a TCP agent disposed on a host computer side, or a device integrated in a TCP agent.

In the transmission control apparatus according to this embodiment of the present invention, the receiving unit receives the status information, fed back by the optimization server in response to the query request sent by the sending unit, of the link between communication nodes, the determining unit determines the recommended values of the parameters for TCP transmission according to the received link status information, and the adjusting unit adjusts the TCP transmission parameters according to the recommended values of the parameters for TCP transmission determined by the determining unit. Thus, the TCP transmission parameters can be determined according to an actual link status of the network, and thereby the TCP transmission control can be performed based the actual link status of the network. Compared with the existing TCP transmission control according to the status of the sent and the received packets, a status of TCP transmission can reflect a congestion status of the network better, avoiding congestion misjudgment and improving a utilization ratio of link resources in the network.

Figure 8:
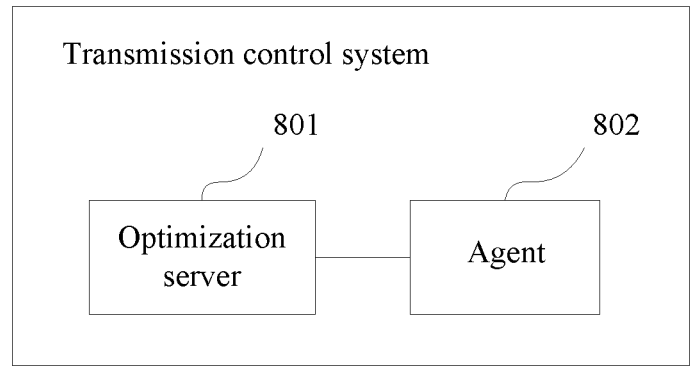
FIG. 8 is a structural diagram of a transmission control system according to an embodiment of the present invention.

Based on the transmission control methods and the transmission control apparatuses according to the embodiments above, a transmission control system is further provided according to an embodiment of the present invention. As illustrated in FIG. 8, the transmission control system includes an optimization server 801 disposed on a network side and an agent 802 disposed on a host computer side. The optimization server 801 has the same function as the transmission control apparatus illustrated in FIG. 6 and the agent 802 has the same function as the transmission control apparatus illustrated in FIG. 7, for which reference can be made to the descriptions in the embodiments above and the description is not repeated herein.

Figure 9:
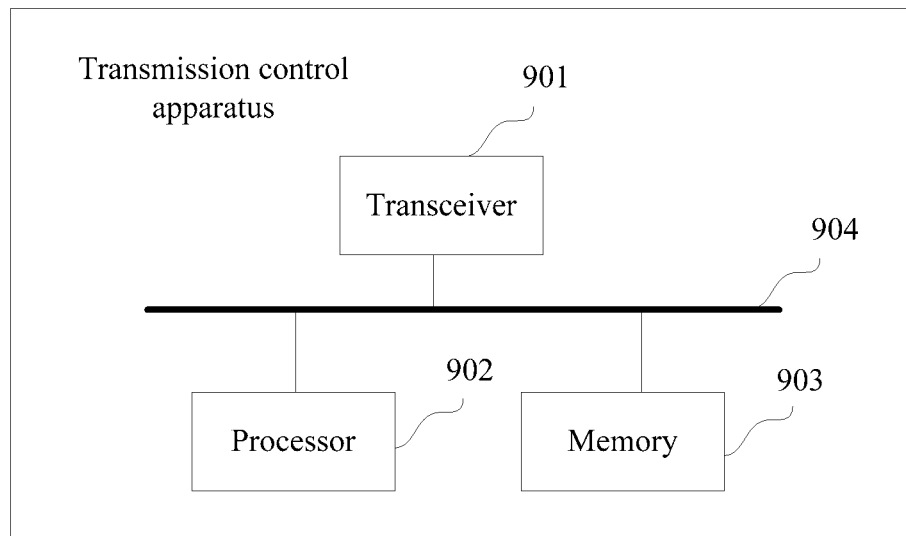
FIG. 9 is a structural diagram of a transmission control apparatus according to an embodiment of the present invention.

Based on the transmission control apparatuses according to the embodiments above, a transmission control apparatus is further provided according to an embodiment of the present invention. As illustrated in FIG. 9, the apparatus includes: a transceiver 901, a processor 902, a memory 903 and a bus 904. The transceiver 901, the processor 902 and the memory 903 are connected to the bus 904.

In a first aspect, the processor 902 is configured to: acquire link status information of a network by using the transceiver 901, determine recommended values of parameters for TCP transmission according to the link status information, send the determined recommended values of the parameters to a TCP agent, and instruct the TCP agent to perform TCP transmission control.

In particular, the processor 902 determines a recommended size of an initial congestion window and recommended congestion avoidance thresholds corresponding to different subscribed bandwidths according to the link status information;

instructs the TCP agent to, in a slow start phase, adjust an initial sending window according to the recommended size of the initial congestion window and transmit segmented packets based on the adjusted initial sending window until a congestion avoidance phase is entered; and instructs the TCP agent to, in the congestion avoidance phase, if a recommended congestion avoidance threshold is less than a size of a receiver window and is less than a congestion avoidance threshold in actual transmission, adjust attenuation of the congestion avoidance threshold and control the attenuated congestion avoidance threshold to be greater than or equal to the recommended congestion avoidance threshold when a packet loss or a retransmission timeout occurs; or instructs the TCP agent to, in the congestion avoidance phase, if the recommended congestion avoidance threshold is greater than or equal to a size of a receiver window, adjust a congestion avoidance threshold to or to approximate to the size of the receiver window and make the congestion avoidance threshold keep synchronized variation with the change of the receiver window.

In a second aspect, the processor 902 sends a query request for a link status to an optimization server by using the transceiver 901, where identifiers of a sending communication node and a receiving communication node involved in TCP transmission are carried in the query request; receives status information, fed back by the optimization server in response to the query request, of a link between communication nodes corresponding to the identifiers of the sending communication node and the receiving communication node carried in the received query request; determines recommended values of parameters for TCP transmission according to the status information of the link; and performs TCP transmission control according to the determined recommended values of the parameters.

The case that the processor 902 determines the recommended values of the parameters for TCP transmission according to the status information of the link includes: acquiring a parameter optimization policy template sent by the optimization server; and determining the recommended values of the parameters for TCP transmission according to the parameter optimization policy template and the received status information of the link between the communication nodes.

Preferably, the case that the processor 902 determines the recommended values of the parameters for TCP transmission includes:

determining a recommended size of an initial congestion window and recommended congestion avoidance thresholds corresponding to different subscribed bandwidths.

The case that the processor 902 performs TCP transmission control according to the determined recommended values of the parameters includes:

in a slow start phase, adjusting an initial sending window according to the recommended size of the initial congestion window and transmitting segmented packets based on the adjusted initial sending window until a congestion avoidance phase is entered; and in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or to approximate to the size of the receiver window and making the congestion avoidance threshold keep synchronized variation with the change of the receiver window.

The processor 902 executes the above process usually with one or more software programs, where the one or more software programs are stored in the memory 903. When the processor 902 needs to execute the process above, the one or more software programs are called into the processor 902 and the process above is completed under the control of the processor 902. Of course, the processor 902 may execute the process above with hardware as well, which is not limited in this embodiment of the present invention.

The transmission control apparatus according to this embodiment of the present invention may perform the transmission control methods illustrated in FIGS. 2 to 5, and reference can be made to the descriptions of FIGS. 2 to 5 for detailed descriptions of the transmission control apparatuses in FIGS. 6, 7 and 9 which are not thorough enough.

It should be noted that the transmission control apparatus above according to this embodiment of the present invention may be a stand-alone device, or be integrated in an optimization server or a TCP agent.

The transmission control apparatus according to this embodiment of the present invention determines the recommended values of the parameters for TCP transmission according to the acquired network link status information, sends the recommended values of the parameters for TCP transmission to the TCP agent, to instruct the TCP agent to perform TCP transmission control according to the recommended values of the parameters, so that the TCP transmission parameters can be set according to an actual link status of the network, that is, the TCP transmission control process is adjusted and controlled based an actual network status. Compared with existing TCP transmission control according to the status of the sent and the received packets, a status of TCP transmission can reflect a congestion status of the network better, avoiding congestion misjudgment and improving a utilization ratio of link resources in the network.

Apparently, a person skilled in the art may make numerous alternations and modifications on the present invention without deviating from the spirit and the scope of the present invention. The present invention is intended to include the alternations and modifications if the alternations and modifications made to the present invention fall within the scope of the claims of the present invention and the equivalents thereof.

What is claimed is:

1. A transmission control method, comprising:
acquiring link status information of a network;
determining recommended values of parameters for Transmission Control Protocol (TCP) transmission according to the link status information; and
sending the recommended values of the parameters to a TCP agent, to instruct the TCP agent to perform TCP transmission control according to the recommended values of the parameters;
wherein determining the recommended values of the parameters for TCP transmission according to the link status information comprises: determining a recommended size of an initial congestion window and recommended congestion avoidance thresholds corresponding to different subscribed bandwidths according to the link status information;
wherein performing TCP transmission control according to the recommended values of the parameters comprises:
in a slow start phase, adjusting an initial sending window according to the recommended size of the initial congestion window and transmitting segmented packets based on the adjusted initial sending window until a congestion avoidance phase is entered; and
in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or approximately to the size of the receiver window and varying the congestion avoidance threshold with variation of the receiver window.

2. A transmission control method, comprising:
sending a query request for a link status to an optimization server, wherein the query request carries identifiers of a sending communication node and a receiving communication node involved in Transmission Control Protocol (TCP) transmission;
receiving status information; fed back by the optimization server in response to the query request, of a link between the sending communication node and the receiving communication node;
determining recommended values of parameters for TCP transmission according to the received status information of the link; and
performing TCP transmission control according to the determined recommended values of the parameters;
wherein determining the recommended values of the parameters for TCP transmission comprises: determining a recommended size of an initial congestion window and recommended congestion avoidance thresholds corresponding to different subscribed bandwidths;
wherein performing TCP transmission control according to the determined recommended values of the parameters comprises:
in a slow start phase, adjusting an initial sending window according to the recommended size of the initial congestion window and transmitting segmented packets based on the adjusted initial sending window until a congestion avoidance phase is entered; and
in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or approximately to the size of the receiver window and varying the congestion avoidance threshold with variation of the receiver window.

3. A transmission control apparatus, comprising a processor and a non-transitory computer-readable medium having processor-executable instructions stored thereon, wherein the processor-executable instructions, when executed by the processor, facilitate:
acquiring link status information of a network;
determining recommended values of parameters for Transmission Control Protocol (TCP) transmission according to the link status information; and
sending the determined recommended values of the parameters to a TCP agent, to instruct the TCP agent to perform TCP transmission control according to the recommended values of the parameters;
wherein determining the recommended values of the parameters for TCP transmission according to the link status information comprises: determining a recommended size of an initial congestion window and recommended congestion avoidance thresholds corresponding to different subscribed bandwidths according to the link status information;
wherein performing TCP transmission control according to the recommended values of the parameters comprises:
in a slow start phase, adjusting an initial sending window according to the recommended size of the initial congestion window and transmitting segmented packets based on the adjusted initial sending window until a congestion avoidance phase is entered; and
in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs: or in the congestion avoidance phase, if the recommended congestion avoidance threshold is greater than or equal to a size of a receiver window, adjusting a congestion avoidance threshold to or approximately to the size of the receiver window and varying the congestion avoidance threshold with variation of the receiver window.

4. A transmission control apparatus, comprising a processor and a non-transitory computer-readable medium having processor-executable instructions stored thereon, wherein the processor-executable instructions, when executed by the processor, facilitate:

sending a query request for a link status to an optimization server, wherein the query request carries identifiers of a sending communication node and a receiving communication node involved in Transmission Control Protocol (TCP) transmission;

receiving status information, fed back by the optimization server in response to the query request, of a link between the sending communication node and the receiving communication node;

determining recommended values of parameters for TCP transmission according to the status information of the link; and adjusting the TCP transmission parameters according to the recommended values of the parameters;

wherein determining the recommended values of parameters for TCP transmission according to the link status information comprises: determining a recommended size of an initial congestion window and recommended congestion avoidance thresholds corresponding to different subscribed bandwidths;

wherein adjusting the TCP transmission parameters according to the recommended values of the parameters comprises:

in a slow start phase, adjusting an initial sending window according to the recommended size of the initial congestion window and transmitting segmented packets based on the adjusted initial sending window until a congestion avoidance phase is entered; and in the congestion avoidance phase, if a recommended congestion avoidance threshold is less than a size of a receiver window and is less than a congestion avoidance threshold in actual transmission, adjusting attenuation of the congestion avoidance threshold and controlling the attenuated congestion avoidance threshold to be greater than or equal to the recommended congestion avoidance threshold when a packet loss or a retransmission timeout occurs; or, in the congestion avoidance phase, if the recommended congestion avoidance threshold is greater than or equal to a size of a receiver window, adjusting a congestion avoidance threshold to or approximately to the size of the receiver window and varying the congestion avoidance threshold with variation of the receiver window.

* * * * *